United States Patent [19]

Hochella et al.

[11] Patent Number: 5,122,185
[45] Date of Patent: Jun. 16, 1992

[54] LOW PRESSURE DROP, HIGH SURFACE AREA PLATINUM RECOVERY SYSTEM IN A NITRIC ACID PLANT

[75] Inventors: William A. Hochella, Coatesville; Steven A. Heffernen, Ambler, both of Pa.

[73] Assignee: Johnson Matthey Inc., Valley Forge, Pa.

[21] Appl. No.: 716,548

[22] Filed: Jun. 17, 1991

[51] Int. Cl.$^5$ .............................................. C22B 11/00
[52] U.S. Cl. ..................................... 75/410; 266/287; 423/22
[58] Field of Search .................... 75/410; 423/22, 390; 502/34; 266/287

[56] References Cited

U.S. PATENT DOCUMENTS

| 2,747,679 | 5/1956 | Ruthardt | 75/410 |
| 2,920,953 | 1/1960 | Rudorfer | 75/410 |

Primary Examiner—Peter D. Rosenberg
Attorney, Agent, or Firm—Cushman, Darby & Cushman

[57] ABSTRACT

This invention is a method for the recovery of precious metal selected from the group consisting of platinum and rhodium lost from a platinum-containing catalyst during ammonia oxidation processes at a temperature above 850° C. which comprises bringing said lost precious metal into contact with a foraminate element fabricated from a material consisting essentially of palladium, by itself, or palladium and a minor amount of another metal selected from the group consisting of other platinum group metals, Ni, Au, Mn, Mg, Cr, C, B, Cu and alloys of mixtures thereof characterized by (a) a novel configuration whereby the initial product of the formula: curve to flat ratio (C/F) multiplied by mesh size (N) and wire diameter ($d_w$), for the element is greater than at least about 0.9 and (b) where, for a given nitrogen throughput, the weight recovery efficiency is a function of the curve to flat ratio (C/F), wire diameter ($d_w$) and mesh size (N) combination and weight recovery efficiency is improved by increasing the mesh size (N) for a given wire diameter, increasing the wire diameter ($d_w$) for a given mesh size, and increasing the curve to flat ratio (C/F) to a ratio of above about $\pi/2$. Preferably, the initial product of the formula is in the range of from about 0.9 to about 10. The element is preferably selected from the group consisting of woven gauze, knitted fabric, fibe and combinations thereof. It is preferred that the element consist essentially of palladium by itself or palladium alloyed with one or more metals selected from the group consisting of nickel, cobalt, platinum, ruthenium, iridium, gold, silver and copper.

52 Claims, 13 Drawing Sheets

LOW PRESSURE DROP, HIGH SURFACE AREA PLATINUM RECOVERY SYSTEM IN A NITRIC ACID PLANT

This invention relates to a low pressure drop, high surface area platinum recovery system in a nitric acid plant. The system recovers platinum in gases downstream from a platinum catalyst.

BACKGROUND OF THE INVENTION

Nitric acid is produced commercially by passing ammonia and air across a gauze woven from platinum-rhodium-palladium alloy wire. The ammonia, initially, is converted to nitric oxide over the precious metal gauze, and the nitric oxide is, subsequently, oxidized and absorbed to form nitric acid. The ammonia oxidation to nitric oxide generates a large exotherm and raises the temperature of the catalyst in the range of 810° C. to 960° C. During the ammonia oxidation process, some of the precious metal is volatilized from the surface of the gauze wire. The rate of loss is dependent on the temperature, pressure, and flow rate of gases across the catalyst surface. The cost of the precious metal lost from the ammonia oxidation catalyst is a significant part of the cost of operating a nitric acid plant.

The typical methods of recovery of the precious metals volatilized from the oxidation gauze are mechanical separation methods such as filtration, or platinum vapor capture by a palladium alloys system, the so-called "getter" system.

The prior art getter systems were comprised of flat layers of palladium or palladium alloy woven mesh separated by oxidation resistant base metal screens. In U.S. Pat. No. 4,497,657 the collection efficiency of the individual layers of the getter catchment system are maximized by utilizing high surface area to weight ratios by using high mesh to wire diameter products. A getter catchment system was introduced for commercial use, constructed of alternating layers of woven palladium alloy mesh and oxidation resistant base metal screens that were corrugated to a simple sinusoidal like configuration with a maximum developed curve to flat ratio of $\pi/2:1$. The increased developed curve to flat (C/F) ratio increased the surface area per cross sectional area of the reactor. The sinusoidal like corrugated pattern changes the developed curve to flat ratio in a single direction in the plane perpendicular to the gas flow. This is currently marketed commercially as a Low Pressure Drop (LPD), Mass Transfer Limited (MTL) getter catchment system.

The collection efficiency of the individual layers is a function of the net frontal area of the getter that is presented to the gas stream. This frontal area is controlled by the individual wire diameter and the meshes per inch, and the developed curve to flat (C/F) ratio. These system, typically, have recovery efficiencies of 30 to 80 percent depending on the operating conditions of the nitric acid plant and the design of the catchment system.

By curve to flat ratio is meant the ratio of that part of the wire that is not in the base plane of catalyst element (sheet gauze, etc.) to that part that is in the base plane of the element. For curved wire, it is the ratio of the curve above the base to that in the base plane ("flat") of the element.

A typical platinum recovery system for an ammonia oxidation catalyst gauze system and its use is shown and described in U.S. 4,412,859, U.S. 4,526,614 and U.S. 4,497,657, all of which are hereby incorporated by reference, in toto. These gauzes may be made by the method in U.S. Pat. No. 3,470,019, see Example 19, and other known methods.

SUMMARY OF THE INVENTION

This invention is a method for the recovery of precious metal selected from the group consisting of platinum and rhodium lost by volatilization into the gas stream from a platinum-containing catalyst during ammonia oxidation processes at a temperature above 850° C. which comprises bringing said lost precious metal into contact with a foraminate element fabricated from a material consisting essentially of palladium, by itself, or palladium and a minor amount of another metal selected from the group consisting of other platinum group metals, Ni, Au, Mn, Mg, Cr, C, B, Cu and alloys of mixtures thereof characterized by (a) a novel configuration whereby the initial product of the formula: curve to flat ratio (C/F) multiplied by mesh size (N) and wire diameter ($d_w$), for the element is greater than at least about 0.9 and (b) where, for a given nitrogen throughput, the weight recovery efficiency is a function of the curve to flat ratio (C/F), wire diameter ($d_w$) and mesh size (N) combination and weight recovery efficiency is improved by increasing the mesh size (N) for a given wire diameter, increasing the wire diameter ($d_w$) for a given mesh size, and increasing the curve to flat ratio (C/F) to a ratio of above about $\pi/2$. Preferably, the initial product of the formula is in the range of from about 0.8 to about 10. The element is preferably selected from the group consisting of woven gauze, knitted fabric, fiber and combinations thereof. It is also preferred that one or more of the elements be sandwiched between a plurality of screens. It is preferred that the element consist essentially of palladium by itself or palladium alloyed with one or more metals selected from the group consisting of nickel, cobalt, platinum, ruthenium, iridium, gold, silver and copper. It is preferred that palladium be present in an amount of at least about 80% by weight. It is also preferred that C/F be in the range of from above $\pi/2$ to about 4, N be in the range of from about 40 to about 120, $d_w$ be in the range of from about 0.001 to 0.018 and their respective values be such that the initial product of the formula is greater than at least about 0.8, and more preferred the product of the formula be in the range of from about 0.8 to 8.

A second embodiment of this invention is a foraminate element for the recovery of precious metal selected from the group consisting of platinum and rhodium lost from a platinum-containing catalyst during ammonia oxidation processes at a temperature above 850° C. The foraminate element is fabricated from a material consisting essentially of palladium, itself, or palladium and a minor amount of another metal selected from a group consisting of other platinum group metals, Ni, Au, Mn, Mg, Cr, C, B, Cu and alloys of mixtures thereof characterized by (a) a novel configuration whereby the initial product of the formula: curve to flat ratio (C/F) multiplied by mesh size (N) and wire diameter ($d_w$), for said element is greater than at least about 0.8 and (b) where, for a given nitrogen throughput, the weight recovery efficiency is a function of the curve to flat ratio (C/F), wire diameter ($d_w$) and mesh size (N) combination and weight recovery efficiency is improved by increasing the mesh size (N) for a given wire diameter, increasing the wire diameter ($d_w$) for a given mesh size, and increasing the curved to flat ratio (C/F) to a ratio of above $\pi/2$. Preferably, the initial product of the formula is in the range of from about 0.9 to about 10. Preferably, the element is made from a woven gauze, knitted fabric, fiber and combinations thereof. Preferably, the elements are one or more elements sandwiched between a plurality of screens. The element preferably consists essentially of palladium by itself or alloyed with one or more metals selected from the group consisting of nickel, cobalt, platinum, ruthenium, iridium, gold, silver and copper, and preferably, the element consists of palladium being present in an amount of at least 80% by weight. It is preferred that the element have a C/F in the range of from above $\pi/2$ to about 4, N is in the range of from about 40 to about 120 and $d_w$ is in the range of from about 0.001 to about 0.018 and their respective values are such that the initial product of the formula is greater than at least 0.8, preferably from about 0.8 to about 8. Preferably, the C/F ratio is achieved by means of forming the element into a pleat-like configuration preferably parallel pleats. This pleat-like configuration can be achieved by means of pleats in parallel lines or in concentric pattern, such as circles and polygons e.g., squares. The C/F ratio can be achieved by means of the intersecting patterns resulting in a waffle-like pattern, wherein the pattern is regular and comprises straight lines or is regular and comprises curved lines. Alternatively the pattern is random and comprises straight lines or is random and comprises curved lines. The C/F ratio can also be achieved by means of shaped depressions on the surface of the element. In another embodiment of this invention, the C/F ratio is achieved by means of altering a sinusoidal pattern by inserting a straight line between the curved portion of the pattern and the transition of one curve to the opposing curve. The curve radius can also be shortened to improve nesting efficiencies element-to-element. Nesting efficiency can also be improved where the curve radii of the nest of elements are on an imaginary tangent line.

In another embodiment of this invention, the initial product of the formula given above can be modulated across the elements, element to element. For example, the product of that formula given above, $C/F(N)d_w$, can change from higher at the part of the elements initially contacted by the gas stream to lower where the gas stream last contacts the elements. Conversely, the product of the formula can change from lower at the elements initially contacted by the gas stream to higher where the gas stream last contacts the elements. The product of the formula can change by a recognizable pattern across the system, such as a variety of mathematical functions, preferably, linear, parabolic, hyperbolic, step, sinusoidal and combinations thereof.

The initial product of the formula to be modulated can also be modulated by independently varying the C/F, $d_w$ and/or N value. The modulation can be along any of the lines set forth above.

This invention is unique for the following reasons:

1) The curve to flat ratio exceeds any prior art.

2) The invention provides alternate forming techniques for developed curve to flat ratios in excess of $\pi/2$.

3) The invention allows greater flexibility in selection of wire diameter and mesh combinations than the prior art.

4) The invention results in a lower average linear velocity across the palladium alloy woven gauze, because of the decreased rate of open area reduction due to swelling and metal collection.

5) The invention has an increased palladium alloy weight per cross sectional area of the reactor. This will result in higher precious metal retaining capability.

6) Higher collection efficiency is possible due to increased surface area of the palladium alloy element (woven gauze) per cross sectional area of the reactor.

By modulating C/F ratio of the $C/F(N)d_w$ formula across the getter pack, another embodiment of this invention accomplishes the following:

1) If it is assumed that the same precious metal alloy mesh and wire diameter system (80 mesh, 0.003" wire diameter) is used, the amount of available open area in the corrugated woven gauze system per unit area of reactor cross section increases; the amount of precious metal alloy available for collection increases per cross sectional area of reactor; the initial pressure drop and the rate of increase of pressure drop across the corrugated woven gauze system decrease; the increase or decrease of the above are functions of the newly discovered importance of curve to flat ratio. 2) If it is assumed that a palladium alloy gauze system of equal weight per cross sectional area of the reactor is used, either the meshes per inch, wire diameter, or both must be changed.

EXAMPLE

C/F=2.61

Open Area=2.61×equivalent flat pack open area.

Precious Metal Alloy Weight=2.61×equivalent of flat pack precious metal alloy weight.

Relative Reduction in Pressure Drop=

$$\frac{(1)^2}{(2.61)^2} = \begin{array}{l}.1467 \text{ or } 14.67\% \text{ of equivalent flat woven gauze} \\ \text{system, a decrease of pressure drop} \\ \text{of over six (6) fold.}\end{array}$$

3) Varying the developed to curve flat ratio through the collector gauze pack allows for the exact matching of the collector to the operating conditions of the ammonia oxidation reactor.

4) Varying the developed $C/F \times N \times d_w$ product through the gauze pack allows for the exact matching of the collector to the operating conditions of the ammonia oxidation reactor.

This embodiment allows greater flexibility in selection of wire diameter and mesh combinations than the prior art.

This embodiment also results in a lower average linear velocity across the precious metal alloy woven gauze, because of the increased open area, and has an increased precious metal alloy surface area per cross sectional area of the reactor.

One embodiment of this invention uses a pleat-like configuration corrugating in a single direction perpendicular to the gas flow. This pleat-like configuration can be used to develop curve to flat ratios in excess of $\pi/2$. At a developed curve to flat ratio of 2.61, the collection efficiency is 59% greater than a flat pack (ratio of 1) and 37.00% greater than the prior art LPDMTL getter of similar layer construction (but ratio of $\pi/2$) at nitrogen loading of 80 tons ammonia/day/square meter of reactor.

By another embodiment of this invention, namely, modulation of the factors determining surface area, either individually or by the formula, C/F (N) $d_w$, the catalyst surface area can by tailored to be maximum at the point in the system (screen pack) it is most effective and efficient.

The development of the high curve to flat ratio can be accomplished by the following methods:

1) Corrugating in a single direction perpendicular to the gas flow using a sinusoidal or pleat like pattern. This pattern can be used to develop curve to flat ratios in excess of 1:1, preferably over $\pi/2$:1.

2) Corrugating a sinusoidal or pleat like pattern in a radial direction perpendicular to the gas flow can accomplish ratios of developed curve to flat ratios in excess of 1:1, preferably over $\pi/2$:1. These patterns, if the patterns are assumed to be concentric circles, would appear similar to that developed by dropping a pebble in a puddle of water. This invention does not limit itself to the concept of concentric circles but extends to any concentric polygons or the like.

3) corrugating a sinusoidal or pleat like pattern in two or more directions in the plane perpendicular to the gas flow can accomplish ratios of developed curve to flat ratios in excess of 1:1, preferably over $\pi/2$:1. If two directions are chosen and they are perpendicular to one another the resulting pattern would be similar to that of a waffle.

4) This invention does not limit itself to the formation of sinusoidal or pleat-like structures. Increased curve to flat ratios can be developed by pressing solid polygons into flat sheets to form series of shaped depressions on the formed surface.

This invention contemplates the use of varying meshes to compensate for the increase ammonia oxidation gauze width per unit cross sectional area of reactor created by the developed curve to flat ratios in excess of 1:1, preferably $\pi/2$:1.

Also contemplated is the use of varying wire diameters to compensate for the increase in open area per unit cross sectional area of reactor created by the developed curve to flat ratios in excess of 1:1, preferably over $\pi/2$:1. Some components at least of either the warp or the weft of the gauze may be made of thin wire and some of thick wire. Alternatively the entire warp or the entire weft may be made of thin wire and the entire weft and the entire warp made respectively made of thick wire.

This invention contemplates the use varying meshes to compensate for the increase in open area per cross sectional area of reactor created by the developed curve to flat ratios in excess of 1:1, preferably over $\pi/2$:1. Some components at least of either the warp or the weft of the gauze may be made of varying mesh count. Alternatively the entire warp or the entire weft may be made of varying mesh count.

The modulation mode of this invention also contemplates the use of varying wire diameters or meshes to compensate for the increased surface area of the woven gauze per cross sectional area of the reactor created by the developed curve to flat ratios in excess of 1:1, preferably $\pi/2$:1. Some components at least of either the warp or the weft of the gauze may be made of varying meshes or thin wire and some of thick wire. Alternatively the entire warp or the entire weft may be made of thin wire and the entire weft or the entire warp respectively made of thick wire.

Figure 12:
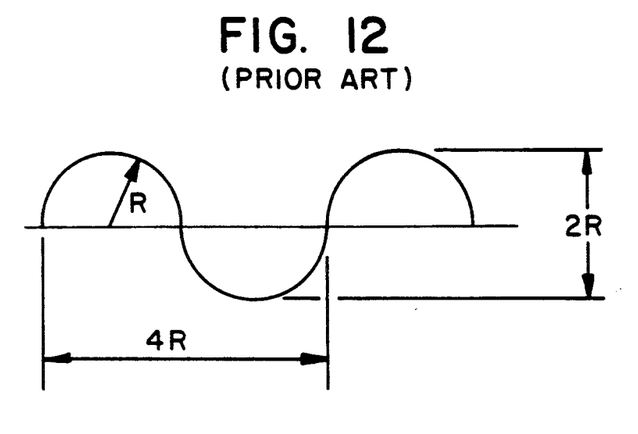
FIG. 12 is a graphic representation of a sinusoidal configuration of a wire in cross-section of the prior art catalyst screen.
Figure 13:
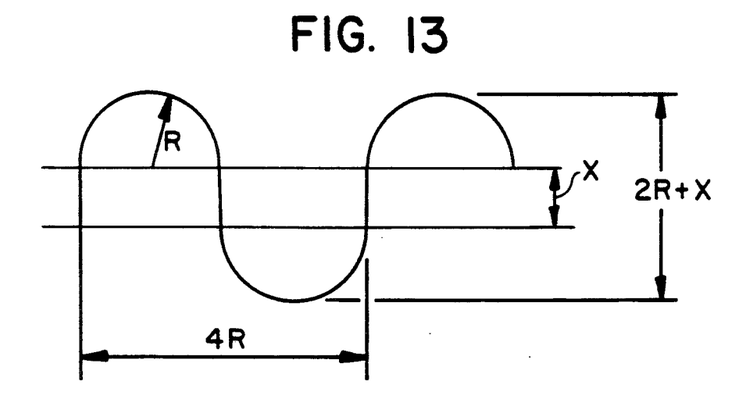
FIG. 13 is also a graphic representation of a wire in a cross-section of a catalyst screen showing the improved, added straight-line segment of this invention.

The typical corrugation consists ideally of a series of semi-circles linked end to end with alternating units above and below a single axis of symmetry. The single axis of symmetry may be considered to be a pair of congruent lines with the separation distance equal to zero (0). The general formula for the curve to flat ratio for two linked semicircles, i.e., one cycle, is as follows:

$$\frac{(\pi * R) + X}{2 * R}$$

where:
$\pi = 3.14159 \ldots$
R = Radius of semi-circle
X = Separation Distance between the Symmetry.
For X=0, the formula simplifies to
$\pi/2$ (See FIGS. 12 and 13).

The prior art is limited to a developed curve to flat ratio of $\pi/2$ and X=0. This invention contemplates the use of developed curve to flat ratios greater than $\pi/2$ and X greater than zero (0). (C/F > $\pi/2$ for X > 0).

Figure 14:
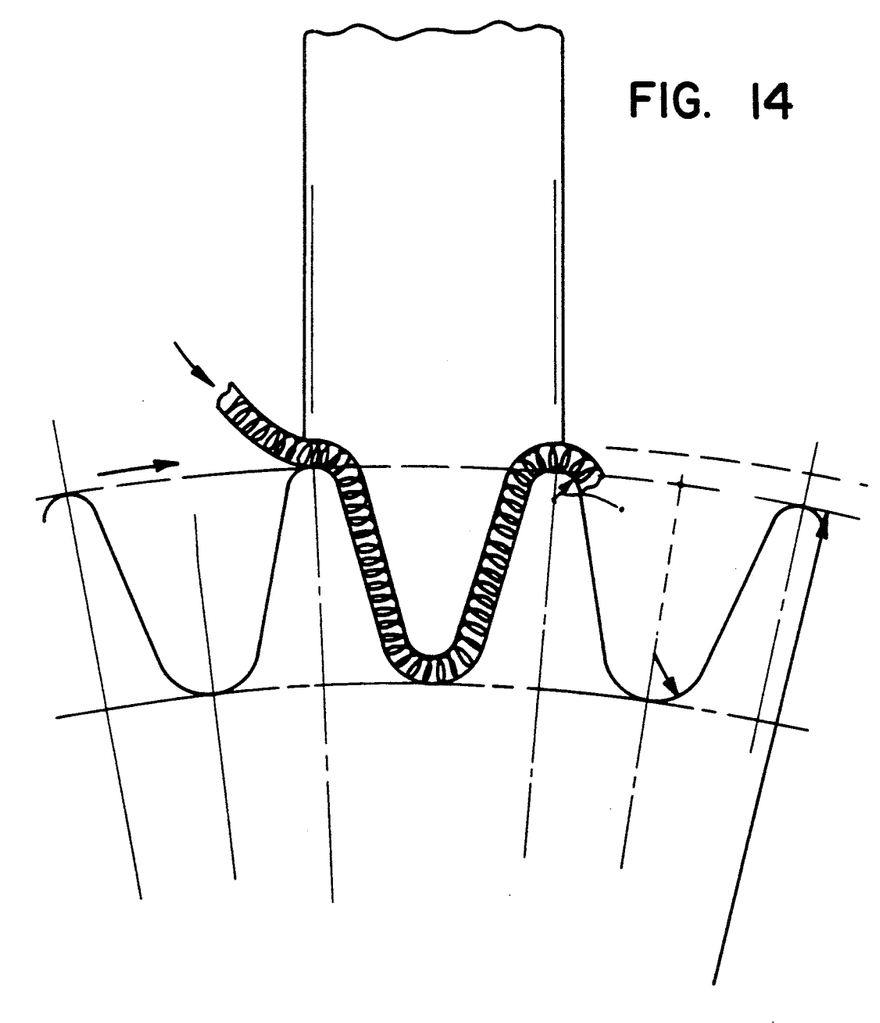
FIG. 14 is a graphic representation of a wire in cross-section of a catalyst screen of this invention, showing a decreased radius at the tip of the pleat.

The introduction of the variable X adds "X" units to the overall thickness of the corrugated layer. It also decreases the ability for an assembly of individual corrugated layers to stack or nest efficiently. However, for a given pitch length and overall height, this can be mitigated by decreasing the apparent radius of the semicircles and linking them with tangent lines (See FIG. 14).

The limiting economic effect of X is the required increased area of the ammonia oxidation catalyst resulting from the increase thickness of the assembled getter system. The technical limit of X is dictated by the design of the nitric acid reactor and the overall thickness of the pack that can fit into the converter head.

BRIEF DESCRIPTION OF THE DRAWINGS

FIGS. 6 to 10 are comparative data comparing prior art elements having a C/F ratio of 1.57 under the same conditions and parameters as in FIGS. 1 to 5.

The theoretical calculations are based upon the formulas in U.S. Pat. No. 4,497,657 at column 9, lines 15 to 30 and column 3, line 50 to column 4, line 18 but adding the C/F ratio as a multiplier to $(N)d_w$. The discovery that the C/F ratio is an important parameter to improve collection efficiency is an important part of this invention.

PREFERRED EMBODIMENT

EXAMPLE 1

A recovery gauze system is to be designed for a nitric acid plant operating at 900° C., 10.5% ammonia, and a loading of 115 tons ammonia/meter²/day. The plant operates on a cycle of 80 days at a pressure of 130 psig. In a typical cycle, this plant will experience a gross precious metal loss from the ammonia oxidation catalyst of 176 troy ounces (t.o.).

Figure 1:
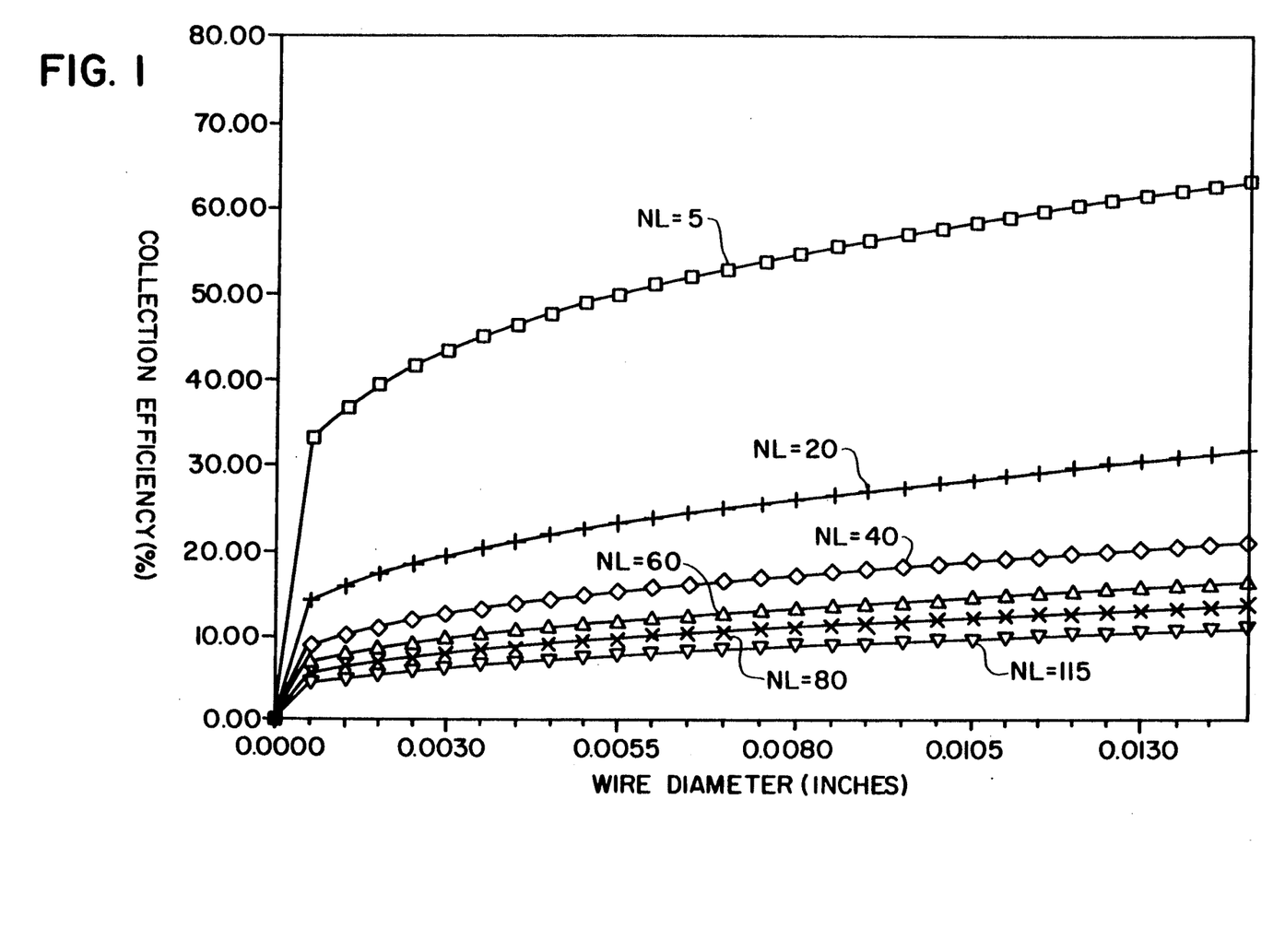
FIG. 1 is a series of curves based on theoretical calculations showing the collection efficiency of the getter system of this invention using an eighteen mesh, C/F ratio of 2.61 element at the nitrogen loadings (NL) and wire diameters shown. "C/F" is curve to flat ratio.
Figure 2:
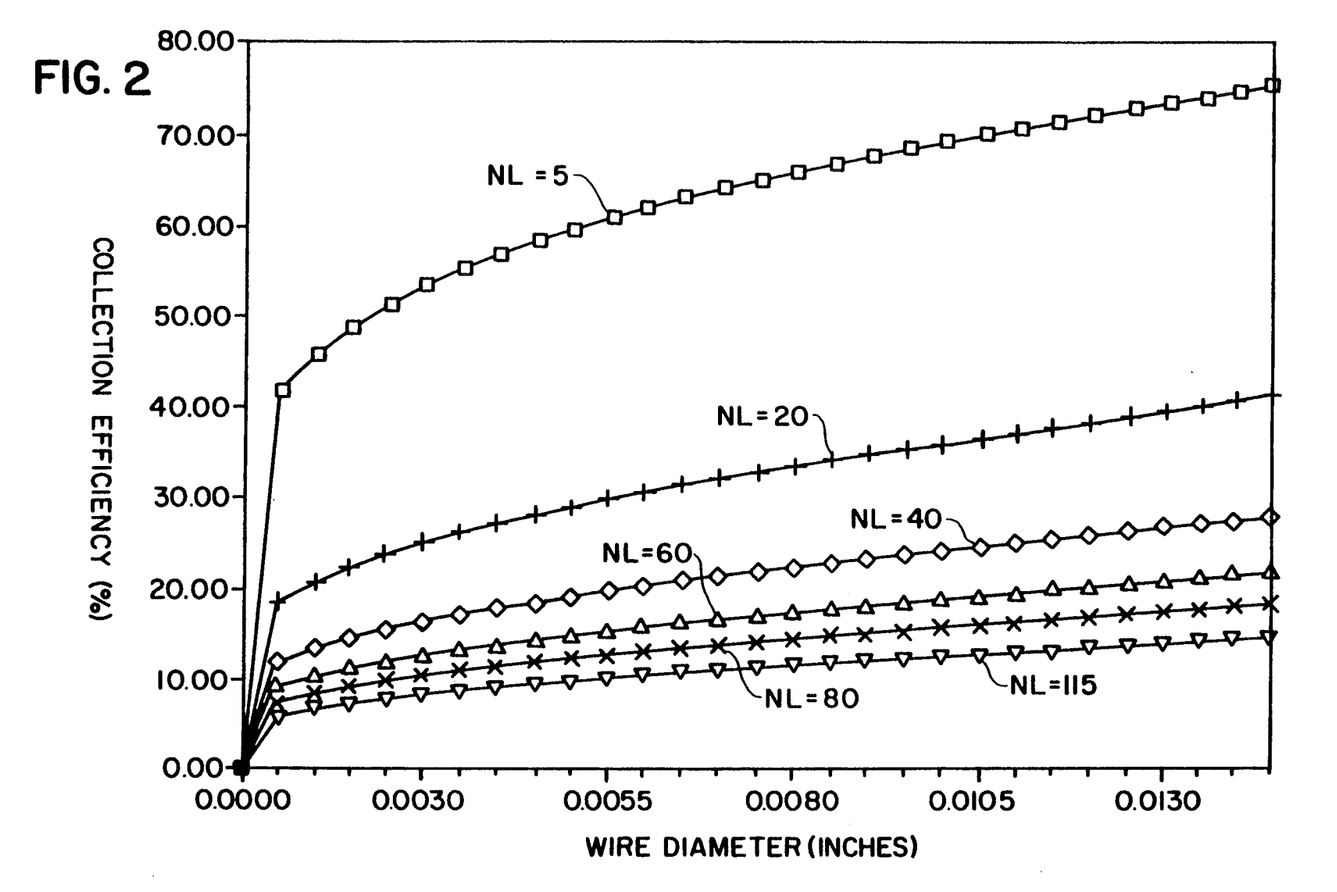
FIG. 2 is a similar series of curves but for a 24 mesh element.
Figure 3:
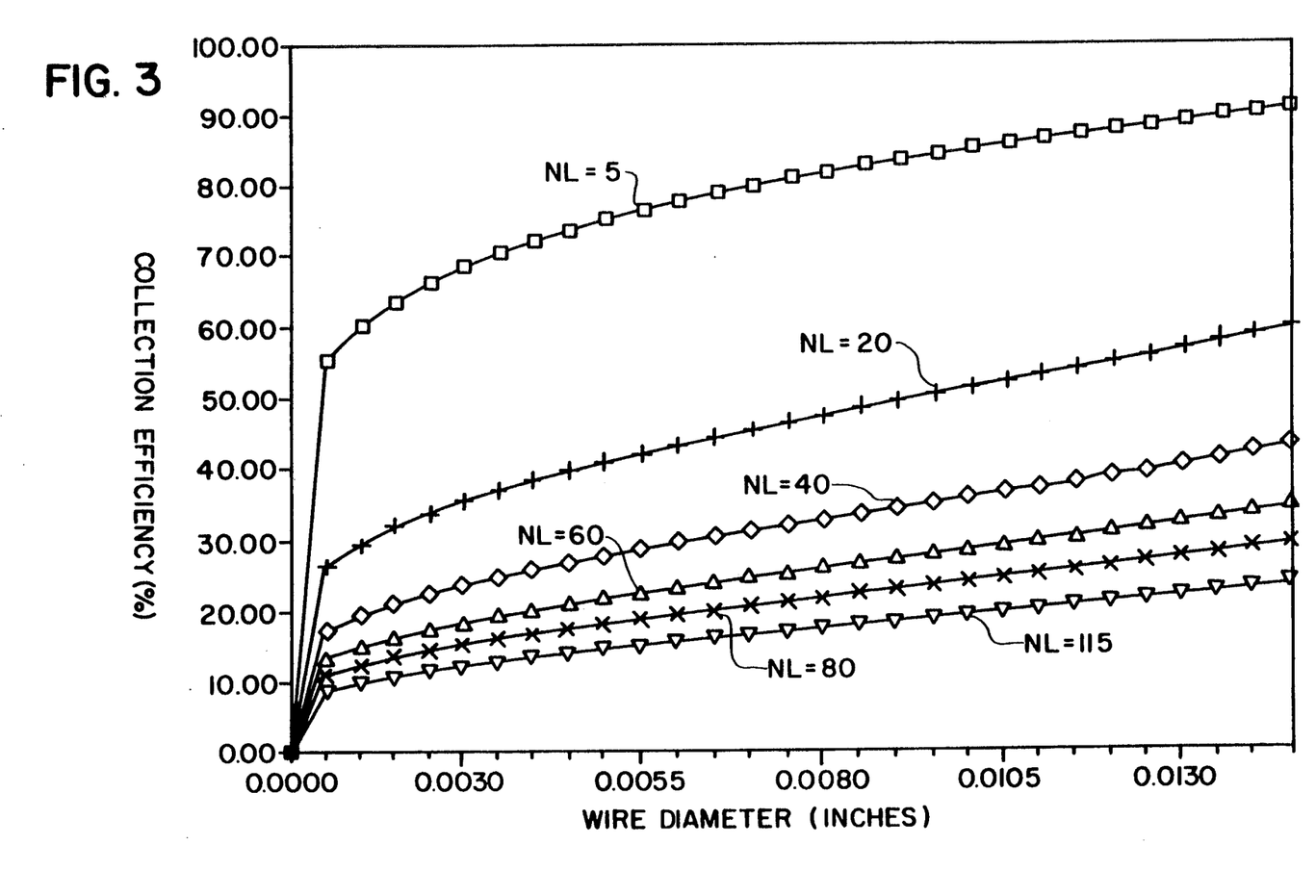
FIG. 3 is a similar series of curves but for a 36 mesh element.
Figure 4:
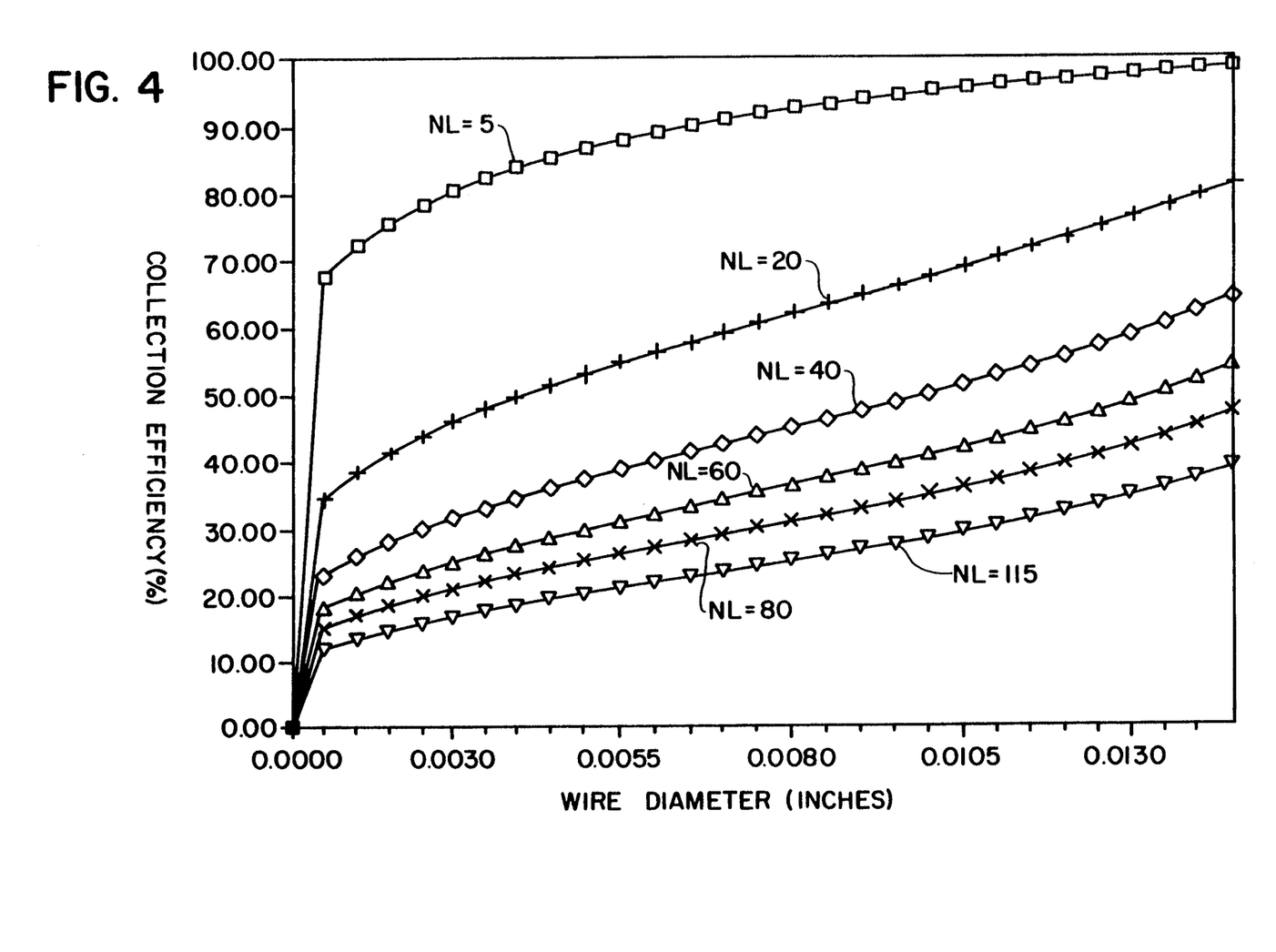
FIG. 4 is a similar series of curves but for a 50 mesh element.
Figure 5:
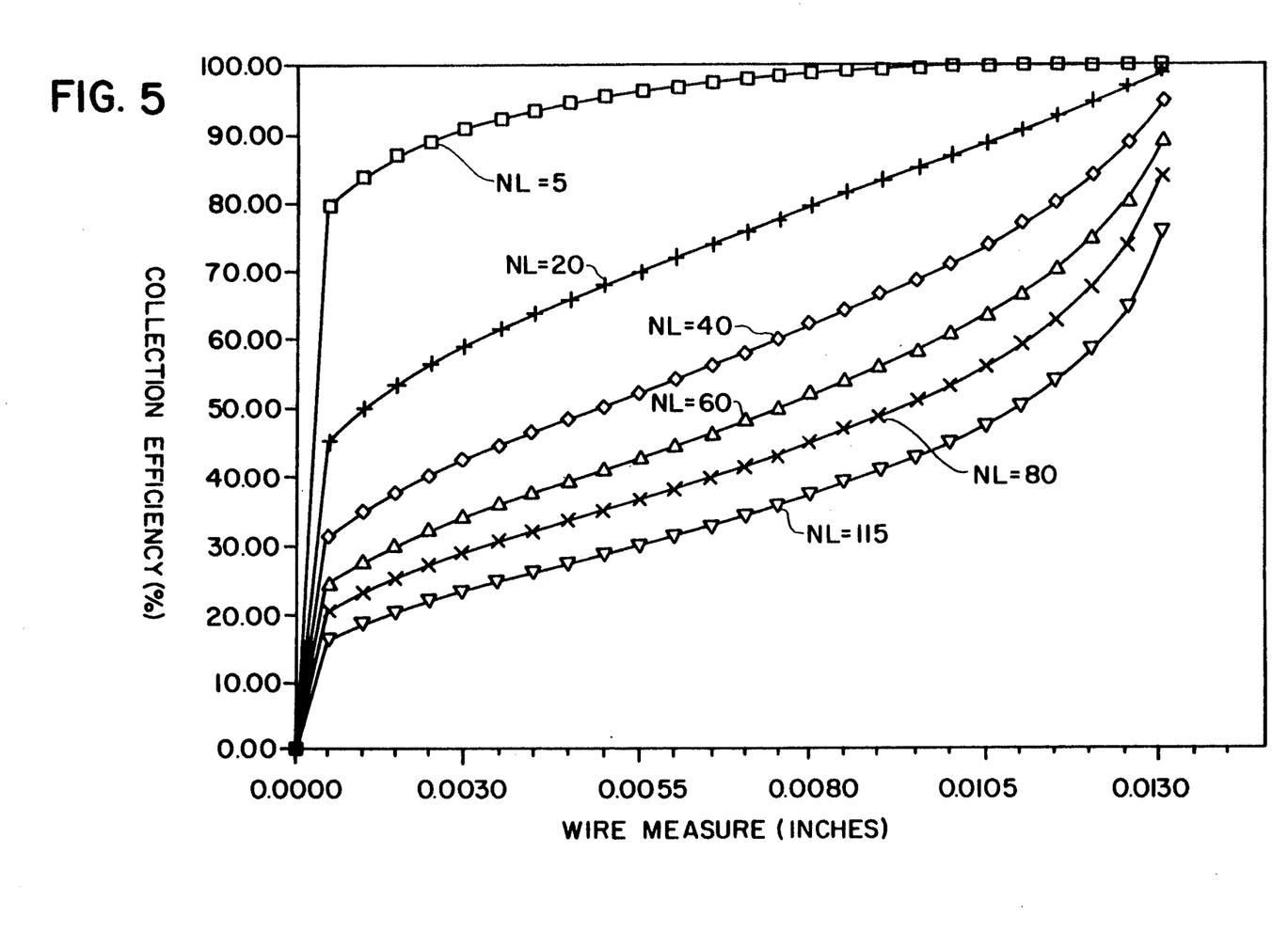
FIG. 5 is a similar series of curves but for a 70 mesh element.
Figure 6:
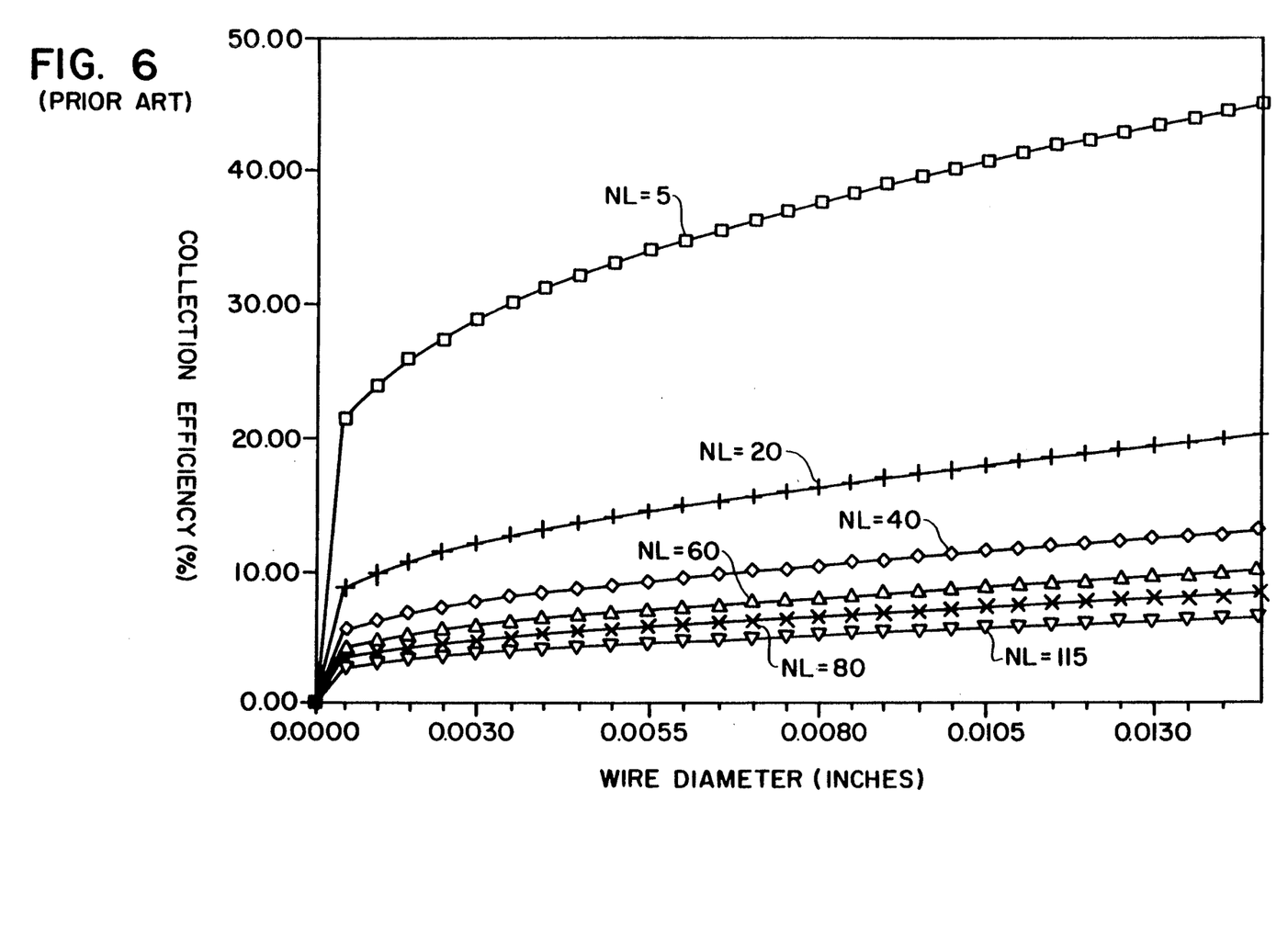
FIG. 6 is a series of curves for a 18 mesh element.
Figure 7:
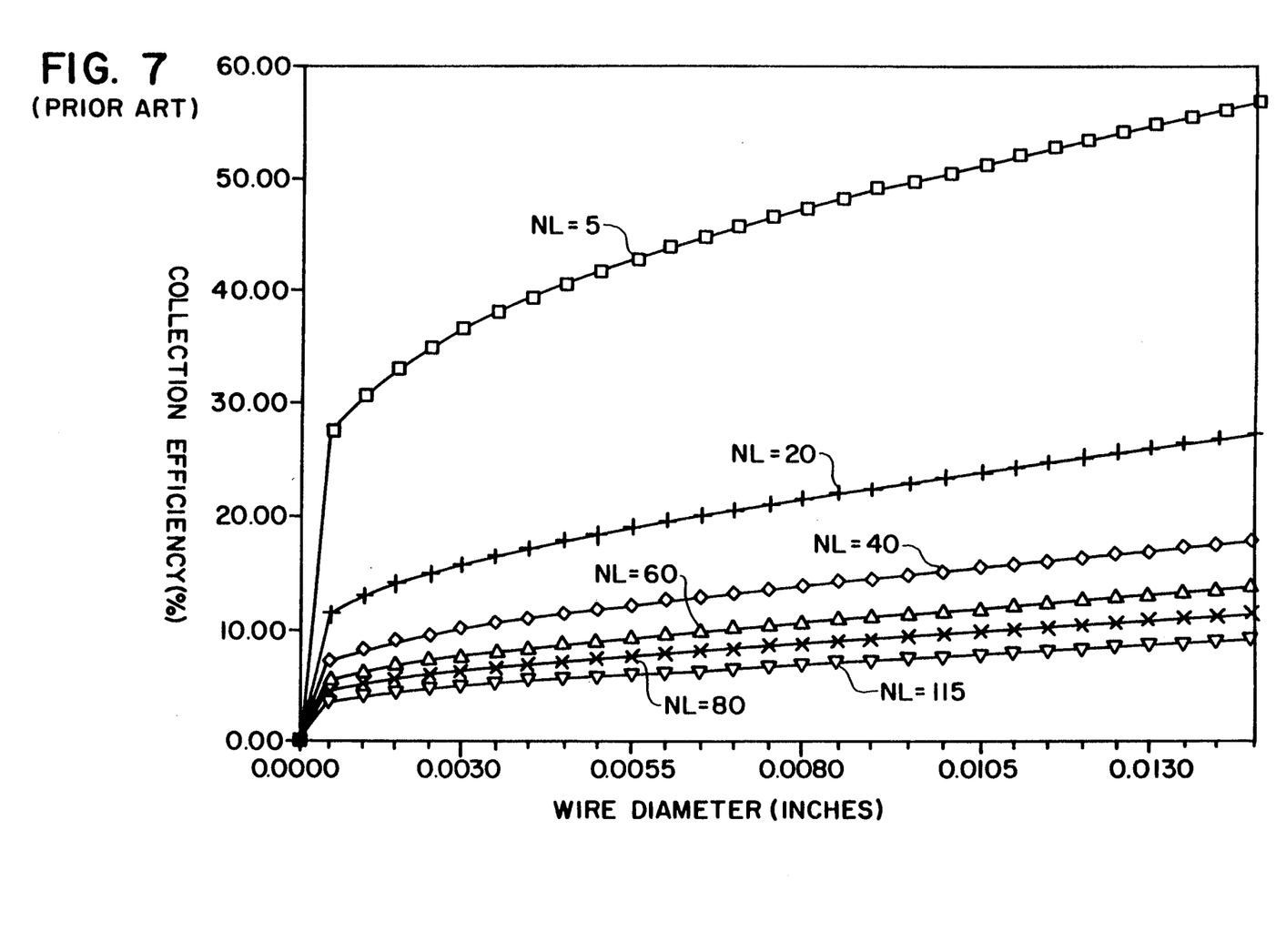
FIG. 7 is a series of curves for a 24 mesh element.
Figure 8:
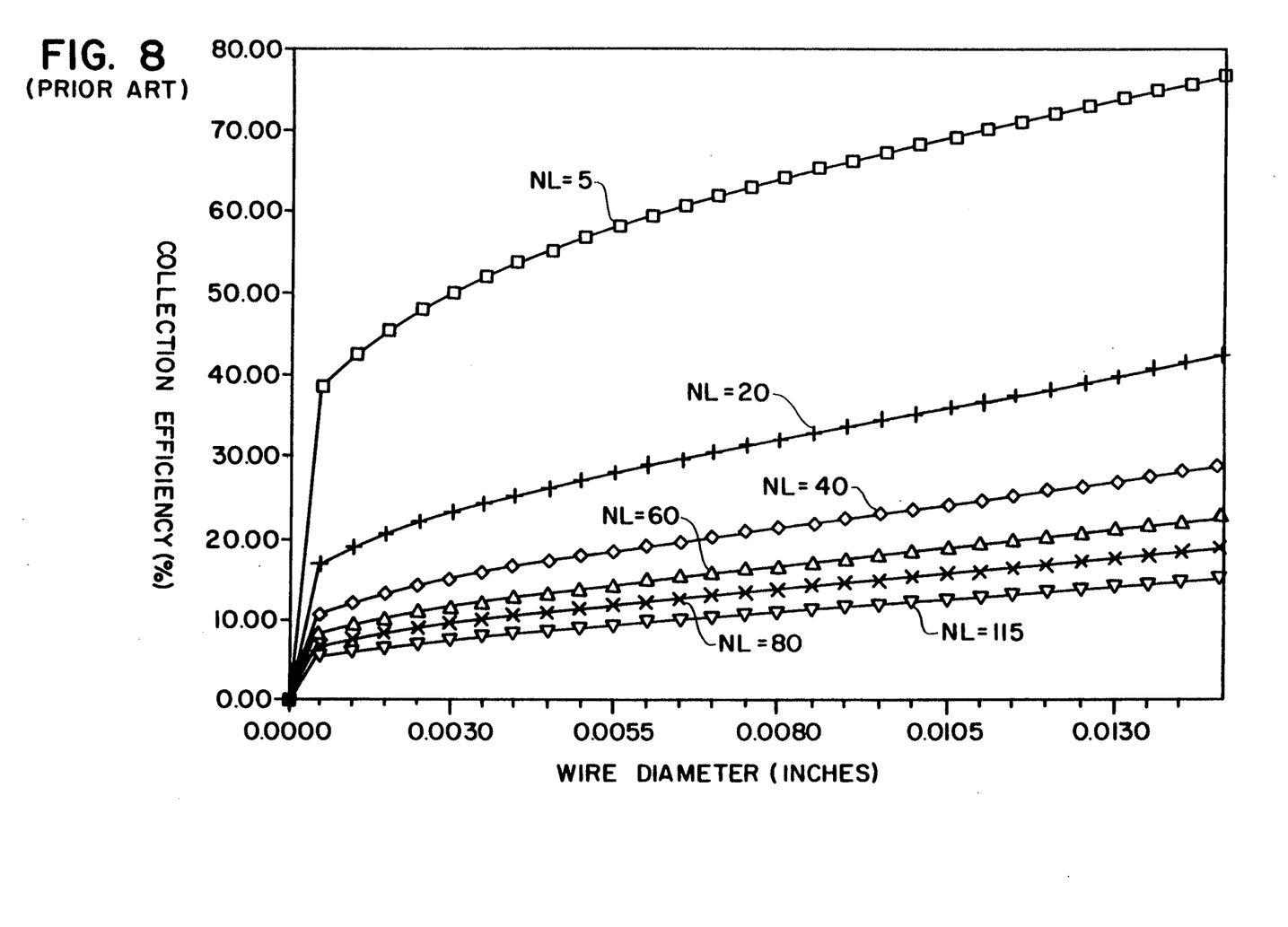
FIG. 8 is a series of curves for a 36 mesh element.
Figure 9:
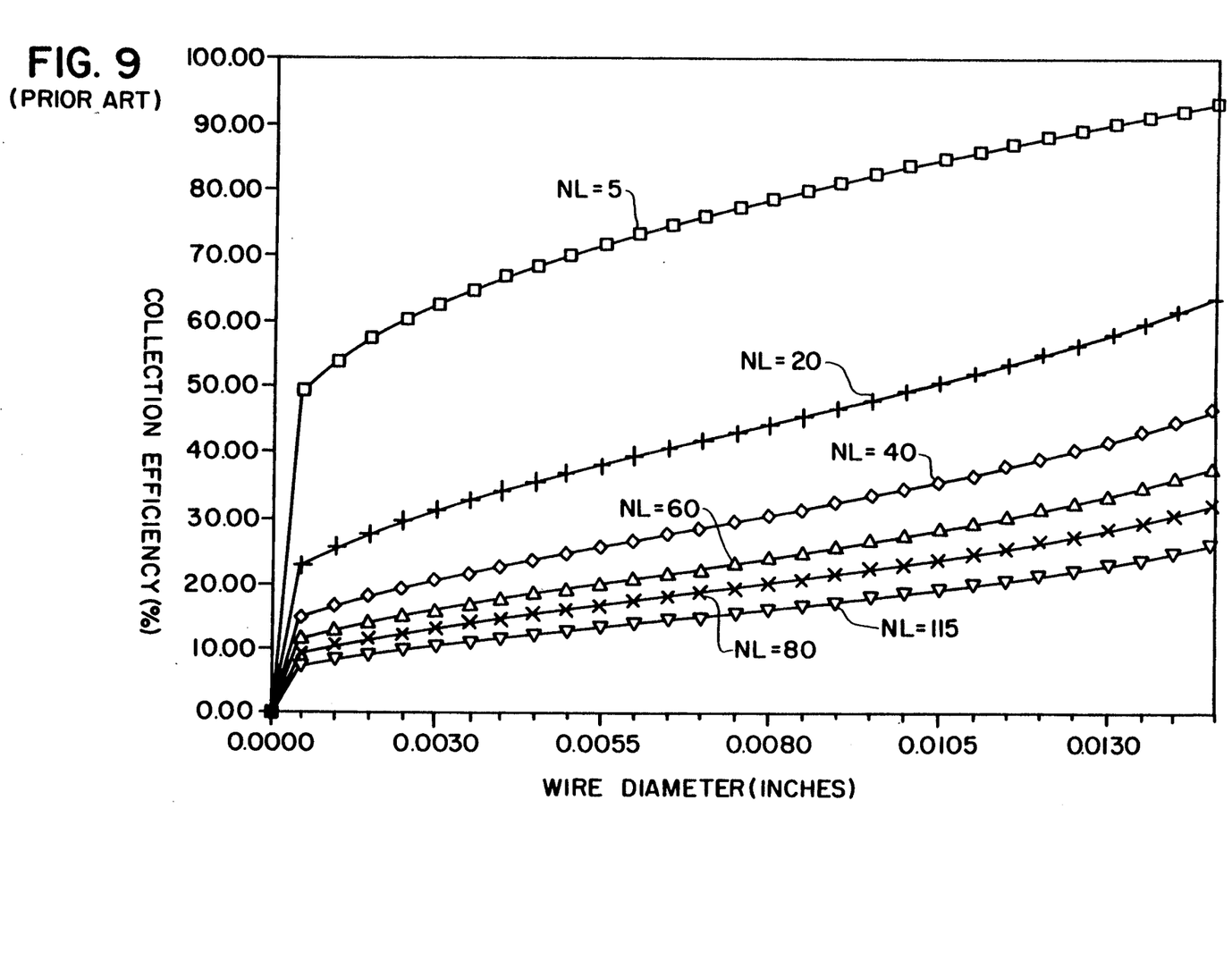
FIG. 9 is a series of curves for a 50 mesh element.
Figure 10:
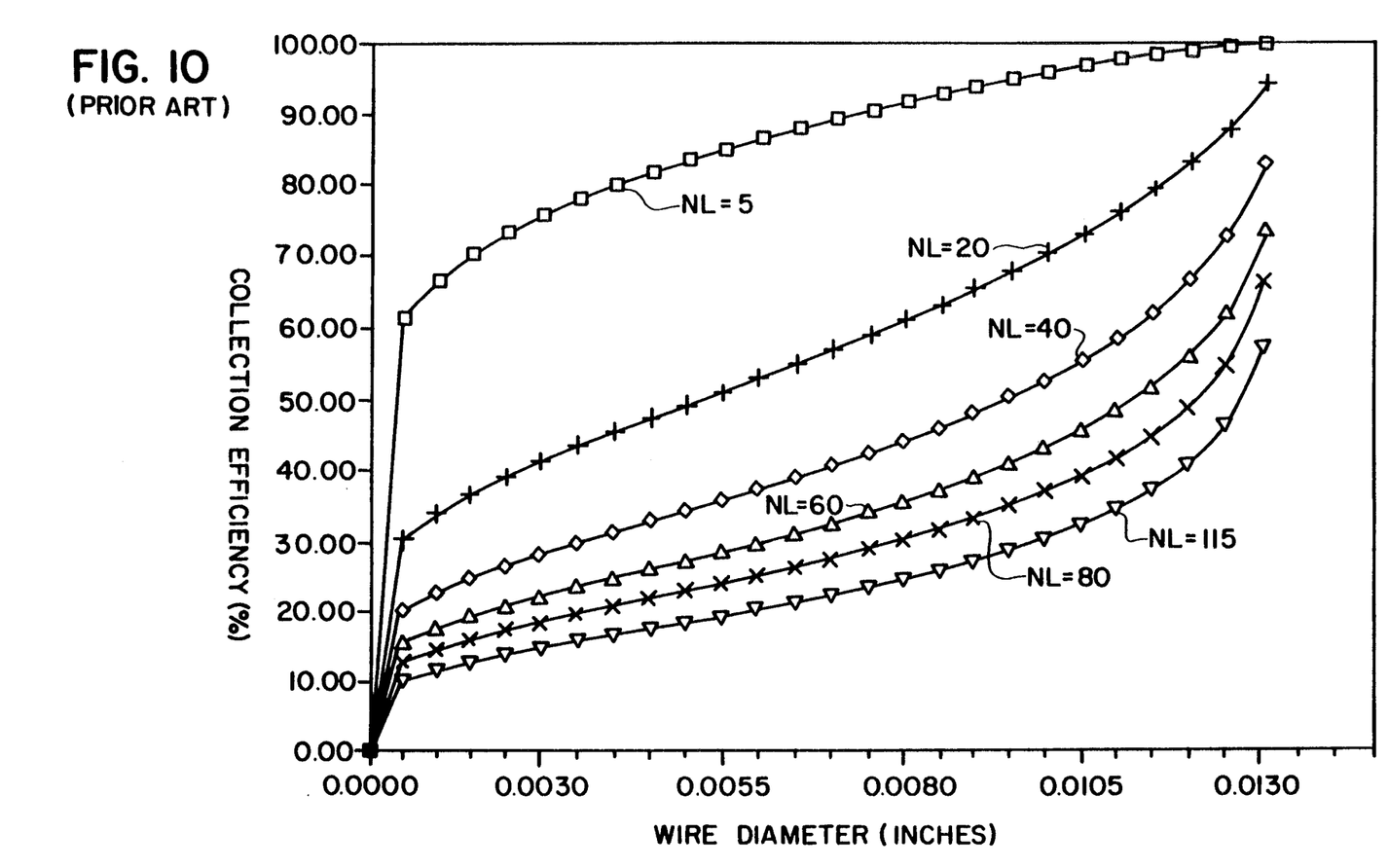
FIG. 10 is a series of curves for a 70 mesh element.
Figure 11:
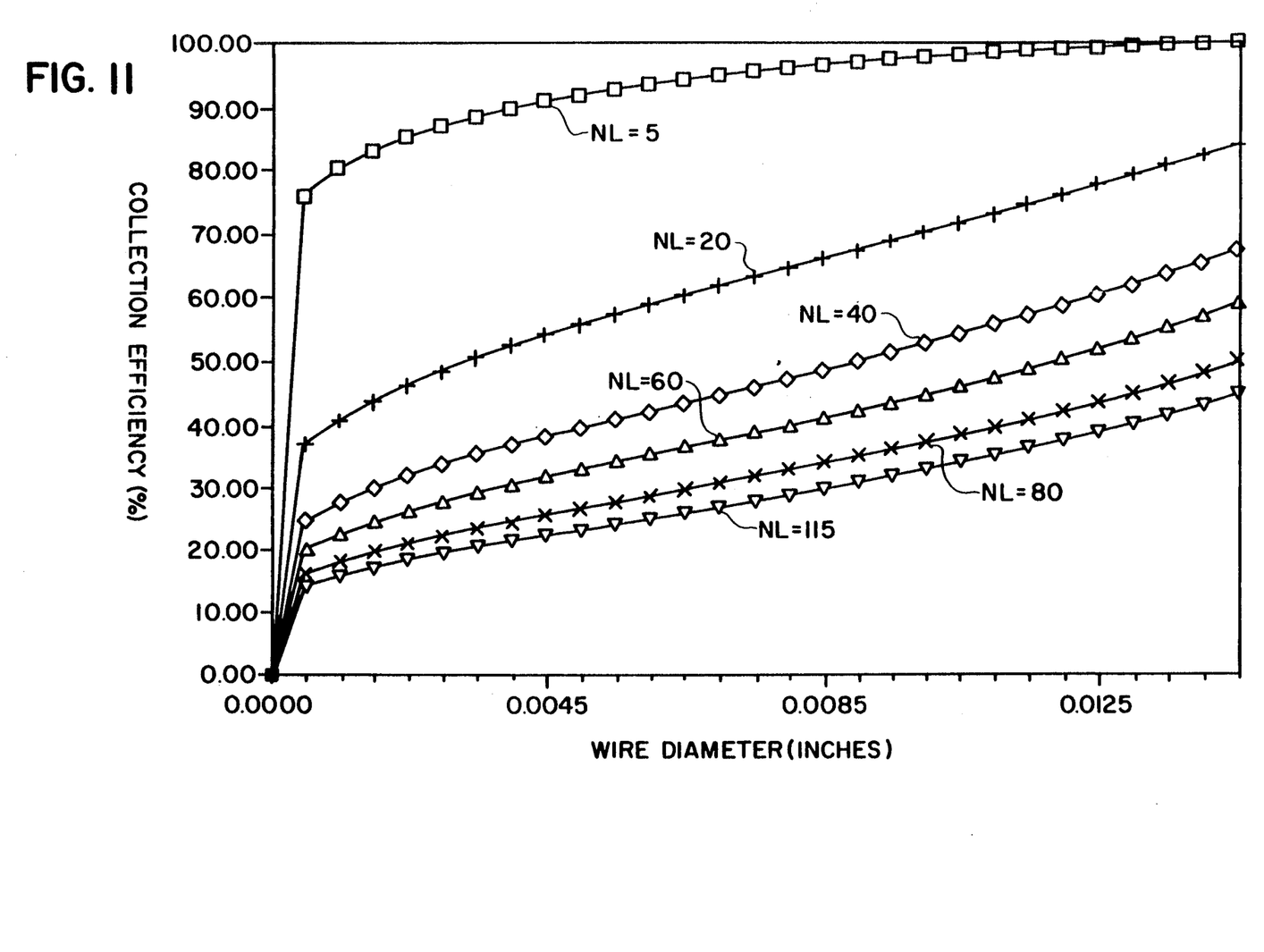
FIG. 11 is a series of curves for Example 2 showing collection efficiency at a 3.30 C/F ratio for 50 mesh catalyst screen at various nitrogen loadings.

From FIG. 3 the instantaneous collection efficiency for a single layer of 36 mesh at a wire diameter of 0.008 inches is 17.09% at a developed curve to flat ratio of 2.61.

| Layer | Mesh | Wire Diameter | C/F | Eff. | Metal Input (t.o.) | Metal Coll. (t.o.) |
|---|---|---|---|---|---|---|
| 1 | 36 | .008" | 2.61 | 17.09% | 174.00 | 29.74 |
| 2 | 36 | .008" | 2.61 | 17.09% | 144.26 | 24.65 |
| 3 | 36 | .008" | 2.61 | 17.09% | 119.61 | 20.44 |
| 4 | 36 | .008" | 2.61 | 17.09% | 99.17 | 16.95 |
| 5 | 36 | .008" | 2.61 | 17.09% | 82.22 | 14.05 |
| 6 | 36 | .008" | 2.61 | 17.09% | 68.17 | 11.65 |
|   |    |       |      |        | Total: | 117.48 |

Getter Catchment Collection Efficiency:

$$\frac{117.48 \text{ t.o. collected}}{174.00 \text{ t.o. lost}} = 67.52\%$$

A flat system of similar mesh-wire diameter configuration would have a pressure drop of 4 psig at the end of the cycle. The invention being disclosed will have the following pressure drop:

$$\frac{1^2}{2.61^2} \times (4 \text{ psig}) = .5872 \text{ psig at end of cycle}$$

EXAMPLE 2

In the nitric acid plant described in the previous example, it is desired to improve the overall metal capture efficiency. This will be accomplished by variations in the $C/F \times N \times d_w$ product. The following is an illustration:

| Layer | Mesh | Wire Diam. | C/F | C/FxNxd$_w$ | Collect Effic. | Metal Input (t.o.) | Collected (t.o.) |
|---|---|---|---|---|---|---|---|
| 1 | 36 | .008" | 3.30 | .950 | 20.50% | 174.00 | 35.67 |
| 2 | 36 | .008" | 3.30 | .950 | 20.50% | 138.33 | 28.36 |
| 3 | 36 | .008" | 3.30 | .950 | 20.50% | 109.97 | 22.54 |
| 4 | 36 | .008" | 3.30 | .950 | 20.50% | 87.43 | 17.92 |
| 5 | 36 | .004" | 3.30 | .924 | 28.00% | 69.51 | 19.46 |
| 6 | 36 | .004" | 3.30 | .924 | 28.00% | 50.05 | 14.01 |
|   |    |       |      |      |        | Total: | 137.96 |

Getter Catchment Collection Efficiency:

$$\frac{137.96 \text{ t.o. Collected}}{174 \text{ t.o. lost}} = 79.28\%$$

A flat getter pack of similar mesh-wire diameter design would have a 4.5 psig pressure at the end of a cycle. The invention being disclosed will have the following pressure drop:

$$\frac{(1)^2}{3.3^2} \times (4.5 \text{ psig}) = .413 \text{ psig at end of cycle.}$$

While the invention has been described in connection with what is presently considered to be the most practical and preferred embodiments, the invention is not limited to the disclosed embodiment but, on the contrary, is intended to cover various modifications and equivalents included within the spirit and scope of the following claims.

We claim:

1. A method for the recovery of precious metal selected from the group consisting of platinum and rhodium lost by volatilization into the gas stream from a platinum-containing catalyst during ammonia oxidation processes at temperatures above 850° C. which comprises bringing said lost precious metal into contact with a foraminate element fabricated from material consisting essentially of palladium, by itself, or palladium and a minor amount of another metal selected from the group consisting of other platinum group metals, Ni, Au, Mn, Mg, Cr, C, B, Cu and alloys of mixtures thereof characterized by (a) a novel configuration whereby the initial product of the formula: curve to flat ratio (C/F) multiplied by mesh size (N) and wire diameter ($d_w$), for said element is greater than at least about 0.9 and (b) where, for a given nitrogen throughput, the weight recovery efficiency is a function of the curve to flat ratio (C/F), wire diameter ($d_w$) and mesh size (N) combination and weight recovery efficiency is improved by increasing the mesh size (N) for a given wire diameter, increasing the wire diameter ($d_w$) for a given mesh size, and increasing the curve to flat ratio (C/F) to a ratio of above about $\pi/2$.

2. The method according to claim 1 wherein the initial product of said formula is in the range from about 0.8 to about 10.

3. The method according to claim 1 wherein said element is selected from the group consisting of a woven gauze, knitted fabric, fiber and combinations thereof.

4. The method according to claim 1 wherein one or more of said elements are sandwiched between a plurality of screens.

5. The method according to claim 1 wherein said element consists essentially of palladium, by itself, or palladium alloyed with one or more metals selected from the group consisting of nickel, cobalt, platinum, ruthenium, iridium, gold, silver and copper.

6. The method according to claim 5 wherein the element consists essentially of palladium said palladium being present in an amount of at least about 80% by weight.

7. The method according to claim 1 wherein C/F is in the range of from above $\pi/2$ to about 4, N is in the range of from about 40 to about 120, $d_w$ is in the range of from about 0.001 to about 0.018 and their respective values are such that the initial product of said formula is greater than at least about 0.8.

8. The method according to claim 1 wherein the initial product of said formula is in the range of from about 0.8 to about 8.

9. A foraminate element for the recovery of precious metal selected from the group consisting of platinum and rhodium lost from a platinum-containing catalyst during ammonia oxidation processes at temperatures above 850° C. said foraminate element fabricated from a material consisting essentially of palladium, itself, or palladium and a minor amount of another metal selected from the group consisting of other platinum group metals, Ni, Au, Mn, Mg, Cr, C, B, Cu and alloys of mixtures thereof characterized by (a) a novel configuration whereby the initial product of the formula: curve to flat ratio (C/F) multiplied by mesh size (N) and wire diameter ($d_w$), for said element is greater than at least about 0.8 and (b) where, for a given nitrogen throughput, the weight recovery efficiency is a function of the curve to flat ratio (C/F), wire diameter ($d_w$) and mesh size (N) combination and weight recovery efficiency is improved by increasing the mesh size (N) for a given wire diameter, increasing the wire diameter ($d_w$) for a given mesh size, and increasing the curve to flat ratio (C/F) to a ratio of above $\pi/2$.

10. The element of claim 9 wherein the initial product of said formula is in the range of from about 0.8 to about 10.

11. The element of claim 9 wherein said element is selected from the group consisting of woven gauze, knitted fabric, fiber and combinations thereof.

12. The element of claim 9 wherein one or more of said elements are sandwiched between a plurality of screens.

13. The element of claim 9 wherein said element consists essentially of palladium, by itself, or alloyed with one or more metals selected from the group consisting of nickel, cobalt, platinum, ruthenium, iridium, gold, silver and copper.

14. The element of claim 13 wherein the element consists essentially of palladium, said palladium being present in an amount of at least about 80% by weight.

15. The element of claim 9 wherein C/F is in the range of from above $\pi/2$ to about 4, N is in the range of from about 40 to about 120, $d_w$ is in the range of from about 0.001 to about 0.018 and their respective values are such that the initial product of said formula is greater than at least 0.8.

16. The element of claim 9 wherein the initial product of said formula is in the range of from about 0.8 to about 8.

17. The element of claim 9 wherein said C/F ratio is achieved by means of forming said element into a pleat-like configuration.

18. The element of claim 17 wherein said C/F ratio is achieved by means of pleats in concentric patterns.

19. The element of claim 18 wherein said pattern is selected from the group of parallel lines, circles and polygons.

20. The element of claim 17 wherein said C/F ratio is achieved by means of intersecting patterns resulting in a waffle-like pattern.

21. The element of claim 20 wherein said waffle-like pattern is regular and comprises straight lines.

22. The element of claim 20 wherein said waffle-like pattern is regular and comprises curved lines.

23. The element of claim 20 wherein said waffle-like pattern is random and comprises straight lines.

24. The element of claim 20 wherein said waffle-like pattern is random and comprises curved lines.

25. The element of claim 17 wherein said C/F ratio is achieved by means of shaped depressions on the surface of said element.

26. The element of claim 9 wherein said C/F ratio is achieved by means of altering a sinusoidal pattern, by inserting a straight line between the curved portion of the pattern at the transition of one curve to the opposing curve.

27. The element of claim 26 wherein the curve radius is shortened to improve nesting efficiency, element-to-element.

28. The element of claim 26 wherein the curve radii of nested elements are on an imaginary tangent line.

29. The method of claim 4 wherein said initial product of said formula is modulated across the elements, element to element.

30. The method of claim 29 wherein said product changes from higher at the elements initially contacted by the gas stream to lower where said ammonia last contacts the elements.

31. The method of claim 29 wherein said product changes from lower at the elements initially contacted by the gas stream to higher where said gas stream last contacts the elements.

32. The method of claim 29 wherein said product changes by a recognizable pattern across the system.

33. The method of claim 32 wherein said pattern can be described by a variety of mathematical functions.

34. The method of claim 27 wherein said mathematical function is selected from the group consisting of linear, parabolic, hyperbolic, step, sinusoidal and combinations thereof.

35. The method of claim 29 wherein said C/F ratio value is modulated.

36. The method of claim 35 wherein said product changes from higher at the elements initially contacted by the gas stream to lower where said gas stream last contacts the elements.

37. The method of claim 35 wherein said product changes from lower at the elements initially contacted by the gas stream to higher where said gas stream last contacts the elements.

38. The method of claim 35 wherein said product changes by a recognizable pattern across the system.

39. The method of claim 38 wherein said pattern can be described by a variety of mathematical functions.

40. The method of claim 39 wherein said mathematical function is selected from the group consisting of linear, parabolic, hyperbolic, step, sinusoidal and combinations thereof.

41. A getter catchment system comprising elements according to claim 9 wherein said initial product of said formula is modulated across the elements, element to element.

42. The system of claim 41 wherein said product changes from higher at the elements initially contacted by the gas stream to lower where said gas stream last contacts the elements.

43. The system of claim 41 wherein said product changes from lower at the elements initially contacted by the gas stream to higher where said gas stream last contacts the elements.

44. The system of claim 41 wherein said product changes by a recognizable pattern across the system.

45. The system of claim 44 wherein said pattern can be described by a variety of mathematical functions.

46. The system of claim 44 wherein said mathematical function is selected from the group consisting of linear, parabolic, hyperbolic, step, sinusoidal and combinations thereof.

47. The system of claim 41 wherein said C/F ratio value is modulated.

48. The system of claim 47 wherein said product changes from higher at the elements initially contacted by the gas stream to lower where said gas stream last contacts the elements.

49. The system of claim 47 wherein said product changes from lower at the elements initially contacted by the gas stream to higher where said gas stream last contacts the elements.

50. The system of claim 47 wherein said product changes by a recognizable pattern across the system.

51. The system of claim 47 wherein said pattern can be described by a variety of mathematical functions.

52. The system of claim 51 wherein said mathematical function is selected from the group consisting of linear, parabolic, hyperbolic, step, sinusoidal and combinations thereof.

* * * * *